July 25, 1933.　　R. T. BOWLING　　1,919,822
PILING IMPLEMENT
Filed June 15, 1931　　6 Sheets-Sheet 1

ROBERT T. BOWLING
Inventor

By Herbert E. Smith
Attorney

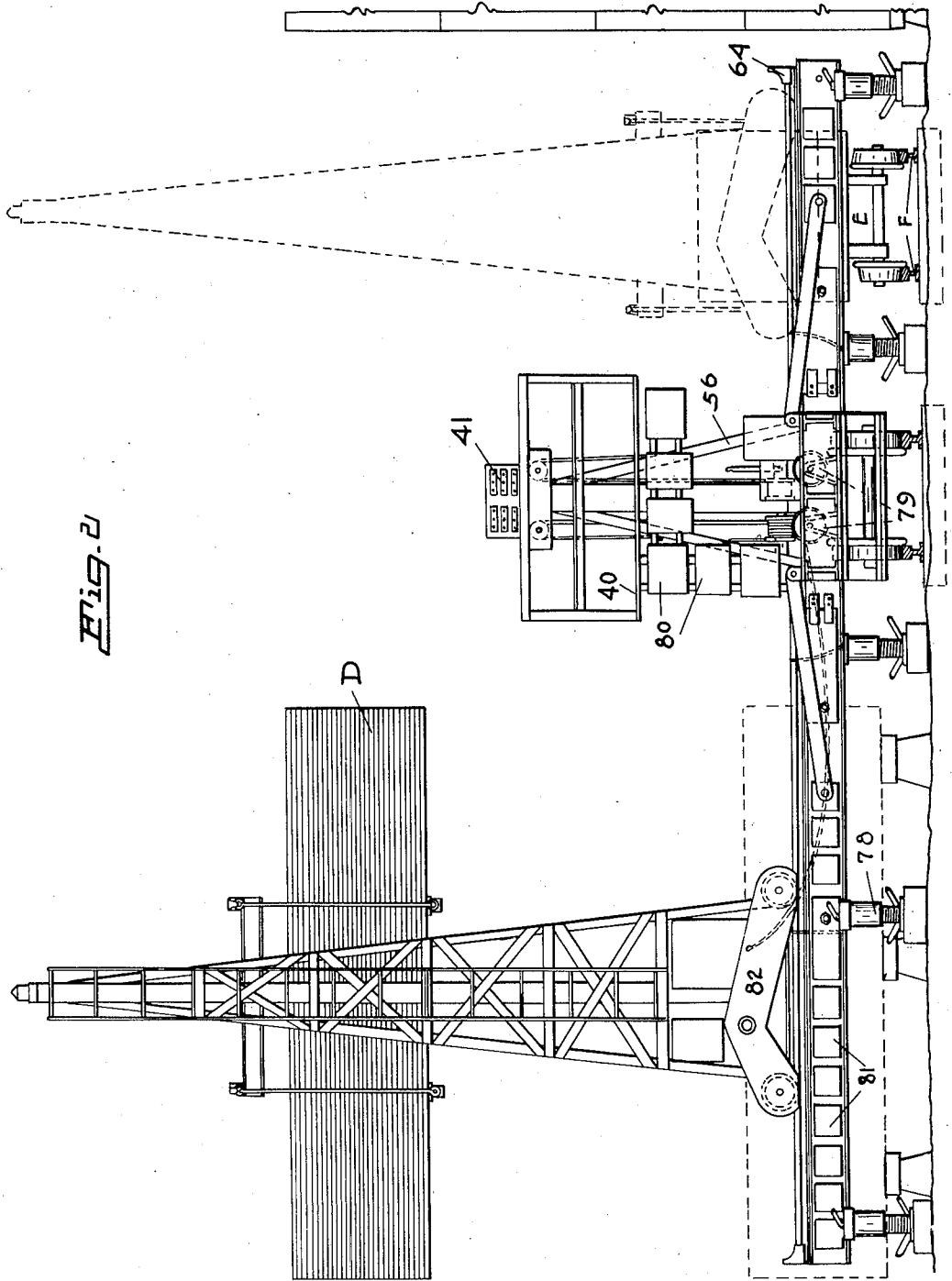

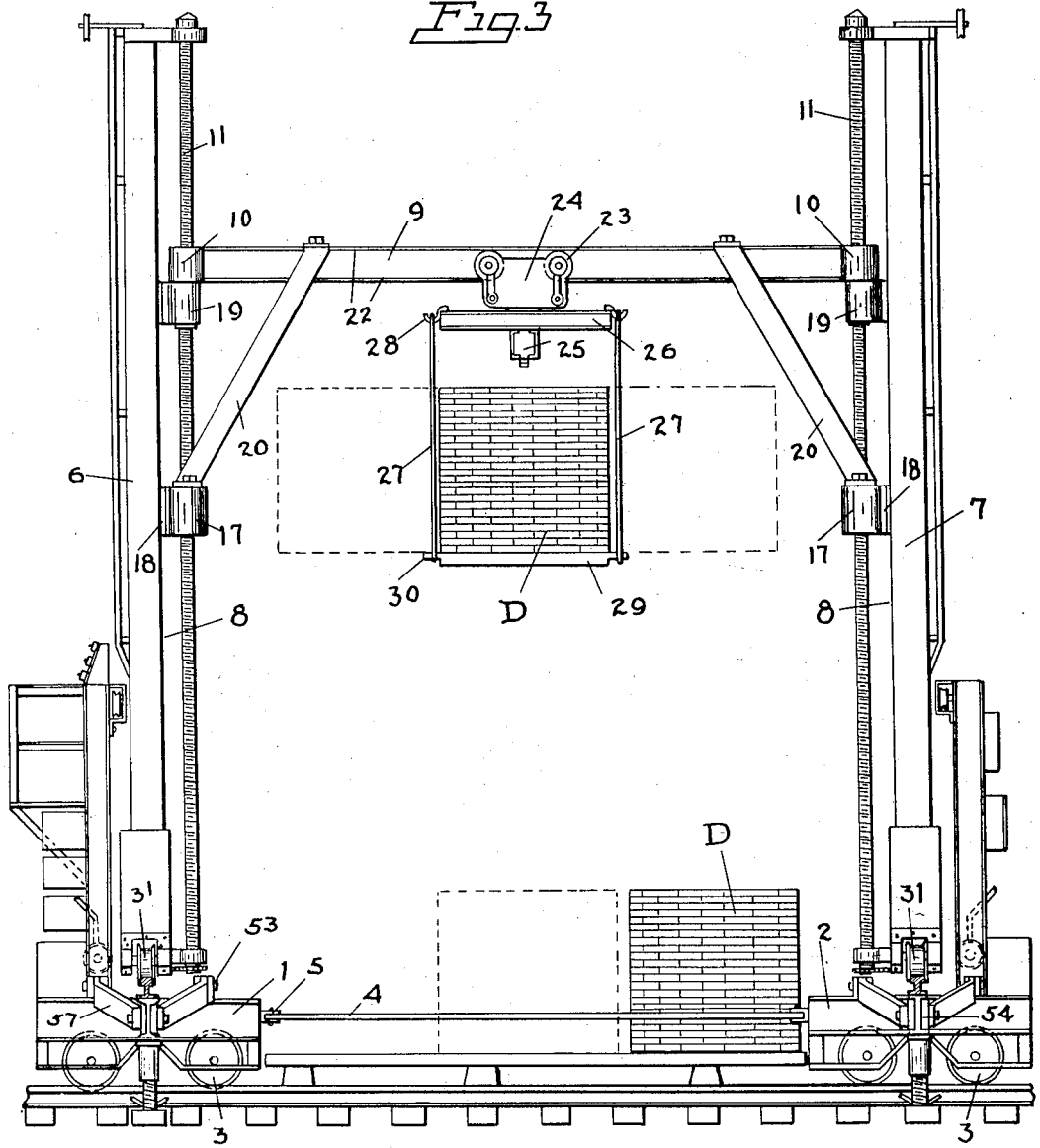

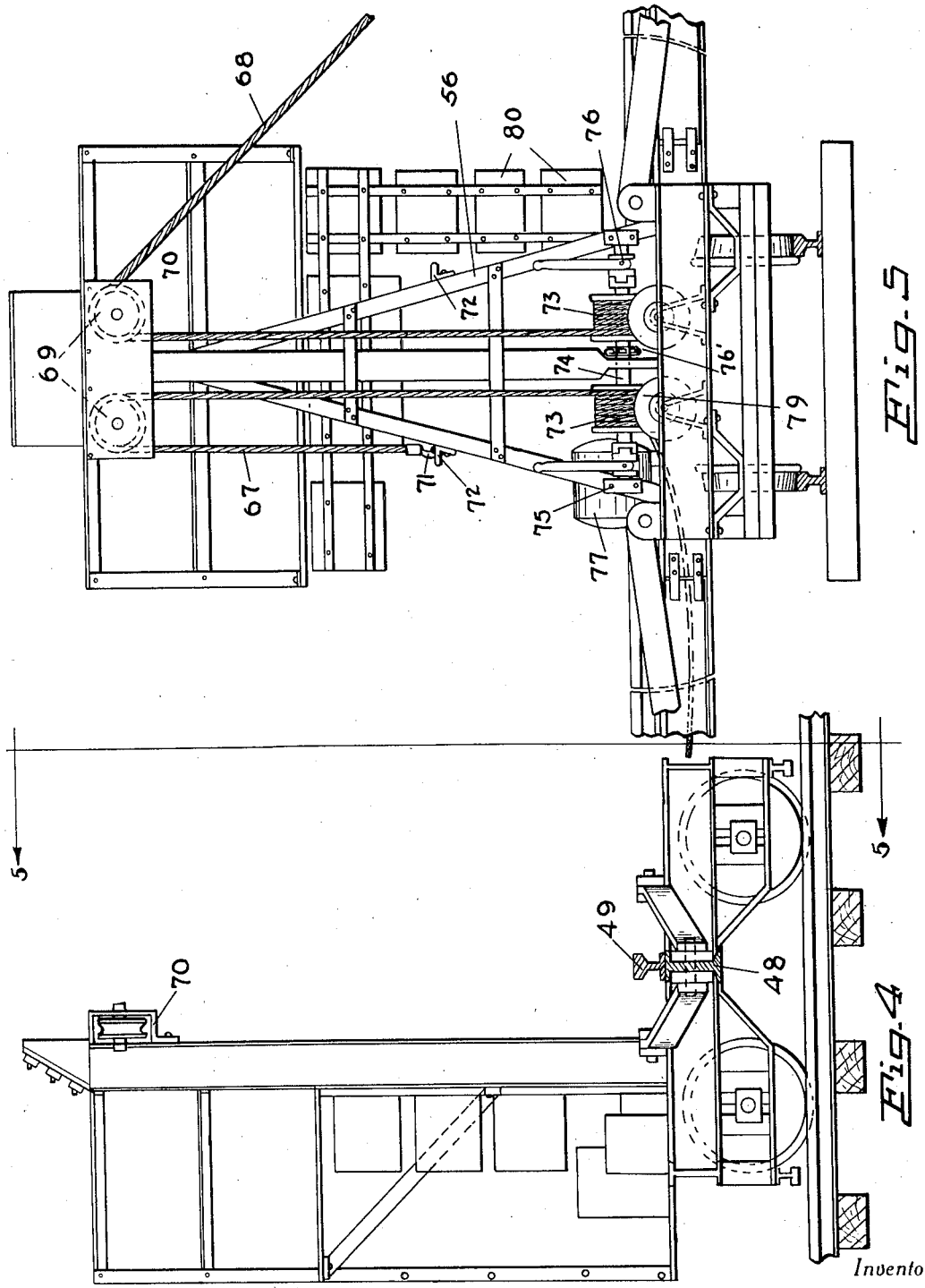

July 25, 1933.  R. T. BOWLING  1,919,822

PILING IMPLEMENT

Filed June 15, 1931  6 Sheets-Sheet 5

Robert T. Bowling
Inventor

By Herbert E. Smith
Attorney

July 25, 1933.  R. T. BOWLING  1,919,822
PILING IMPLEMENT
Filed June 15, 1931      6 Sheets-Sheet 6
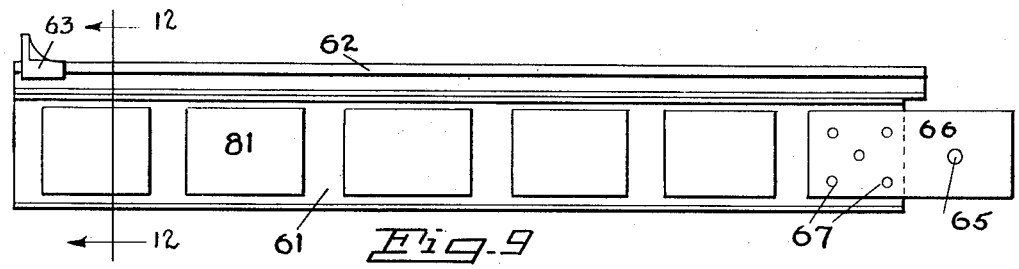
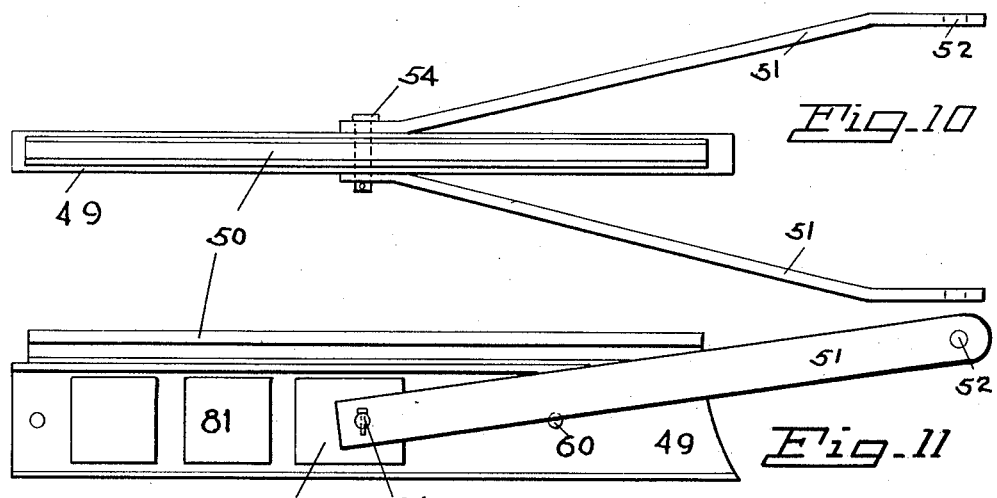
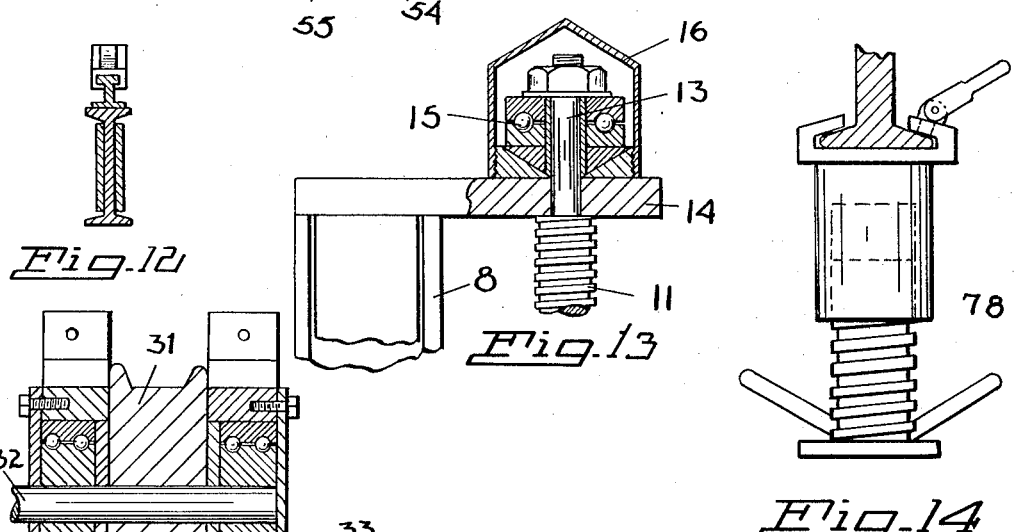
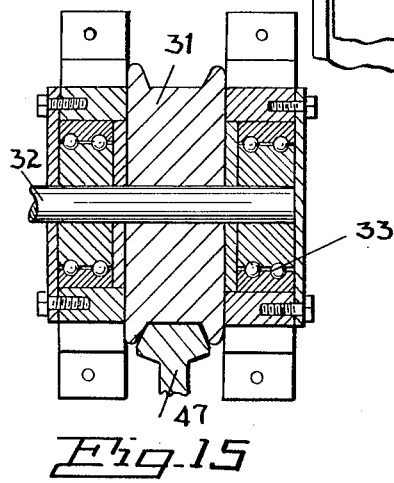
Robert T. Bowling
Inventor
By *Herbert E. Smith*
Attorney Patented July 25, 1933

1,919,822

UNITED STATES PATENT OFFICE

ROBERT T. BOWLING, OF LEWISTON, IDAHO, ASSIGNOR, BY MESNE ASSIGNMENTS, TO POTLATCH FORESTS, INC., OF LEWISTON, IDAHO

PILING IMPLEMENT

Application filed June 15, 1931. Serial No. 544,438.

The present invention relates to an improved piling implement of the portable, wheeled type, involving the use of railway trucks and a traveling crane and elevator, or hoist and sling, with foldable tracks for the crane mounted on the wheeled trucks, together with power operating mechanism, transmission mechanism, and control mechanism for the parts of the implement or apparatus.

While the implement may be adapted for handling various materials, and for various uses, it is particularly designed for use in lumber plants or yards, where the lumber is handled or conveyed about the yard or railway trucks which travel on narrow gage tracks. In the utilization of my improved implement, the narrow gage tracks are employed in parallel pairs, one pair of tracks for the implement, and another pair of tracks, or rails, for the railway-trucks hereinafter referred to as a dolly or as dollies. The lumber in piles is conveyed on the dollies to and from kilns, storage sheds, the saw-mill, and other locations, on a narrow gage track, and the implement of my invention travels on an adjoining track, from place to place, for unloading successive dollies and depositing their piles in stacks of lumber; or for removing successive piles of lumber from a stack and loading these piles on successive dollies. While I have illustrated the implement as building up a stack from piles that are conveyed to the implement on dollies, and described this operation, it will be understood of course that this is merely one exemplification of the utility of the implement, and that the implement can be, and is, employed for other purposes.

By the utilization of the improved implement of my invention, the lumber is handled in bundles, packages, or piles, instead of in single planks, boards, or pieces of timber, and consequently, with the services of three men working at the implement, the handling of the material can be accomplished with a substantial saving in time, labor, and expense.

My invention consists essentially in certain novel combinations and arrangements of parts involving an implement which includes a pair of coupled, spaced, railway trucks of the four wheel type by means of which the implement may be transported on permanent tracks from place to place in the lumber yard; on the railway trucks are mounted transversely arranged tracks that include permanent or fixed rail-sections and laterally hinged foldable rail-sections, with means for laying the foldable sections in alinement with the fixed sections, and a traveling crane is mounted on the rail sections, with means for moving the crane transversely of the longitudinal axis of the implement. The traveling crane has an elevator hoist and sling for handling the pile of lumber, and means are employed for operating the elevator. The operating parts are supplied with power from electric motors carried on the implement, and the motors are controlled by a man stationed on a platform or deck of the implement. Means are provided for electrically connecting the motors to supply stations located alongside the yard tracks, and the yard is provided with power lines for this purpose. In addition to the man employed in charge of the control mechanism, two men are employed for handling the lumber as it is arranged in the sling in a pile, guiding the load or pile, and depositing the pile either in a stack-erection or for loading the pile on a dolly.

In the accompanying drawings I have illustrated one complete example of the implement and its use, in which the parts are combined and arranged according to one mode I have thus far devised for the practical application of the principles of my invention, but it will be understood that various changes and alterations are contemplated and may be made, within the scope of my claims, without departing from the principles of my invention.

Figure 2 is an end view of the implement with the crane-tracks or rails projected for use, and the traveling crane moved laterally of the implement, and ready to deposit its load in the form of a pile of lumber.

Figure 3 is a side view of the implement, illustrating the crane with a load in its sling, indicating by dotted lines how the load may be turned with its swivel-sling, and showing also a pile that has already been deposited in the erection of a stack.

Figure 3a is a detail horizontal sectional view showing the relation of one of the guide blocks of the crane to the mast.

Figure 4 is a side view of one of the wheeled-trucks with its mast, and platform for the control-man.

Figure 5 is a view in elevation, as seen from the right in Figure 4, showing portions of the unfolded crane-tracks, and the operating cables for the tracks.

Figure 9 is a detail side elevation of one of the extension crane-tracks adapted for attachment to a foldable or hinged section of a crane-track.

Figure 10 and Figure 11 show, respectively, a top view and a side view of one of four crane-track sections that are hinged to the implement and adapted to unfold therefrom into horizontal position.

Figure 12 is a transverse sectional view at line 12—12 of Figure 9.

Figure 13 is an enlarged, sectional detail view at the top of one of the operating screws for the elevator, together with the top portion of the supporting mast therefor.

Figure 14 is a detail view showing one of a number of jacks used to support the crane-tracks (one of which is shown in section) when the crane is being used.

Figure 15 is an enlarged detail sectional view of one of the four traction rollers for the traveling crane.

Figure 1:
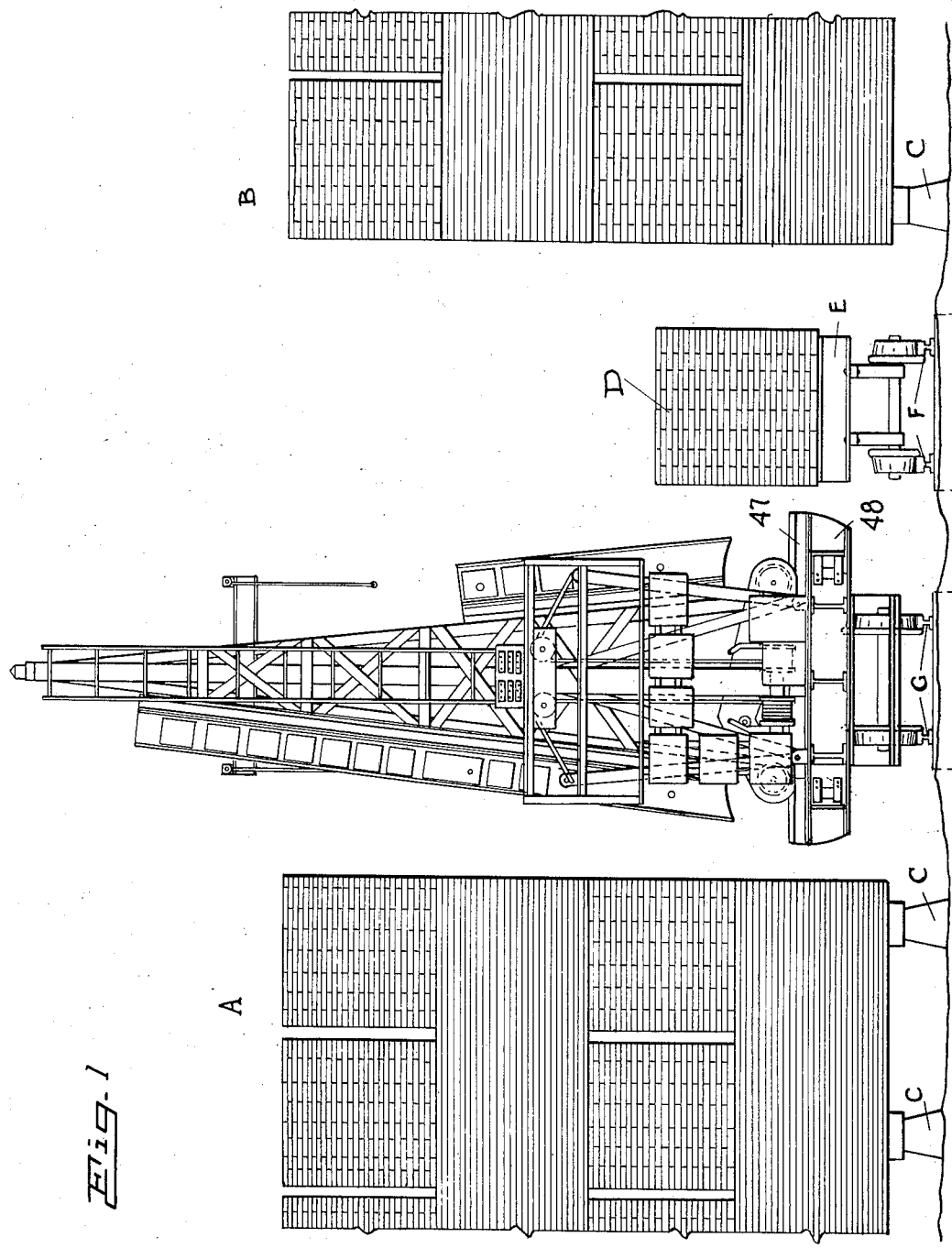
Figure 1 is a view in end elevation showing the implement with the crane-tracks or rails folded, standing beside a loaded dolly, and both the implement and dolly located between two stacks of lumber, which stacks have been erected with successively deposited piles of lumber.
Figure 6:
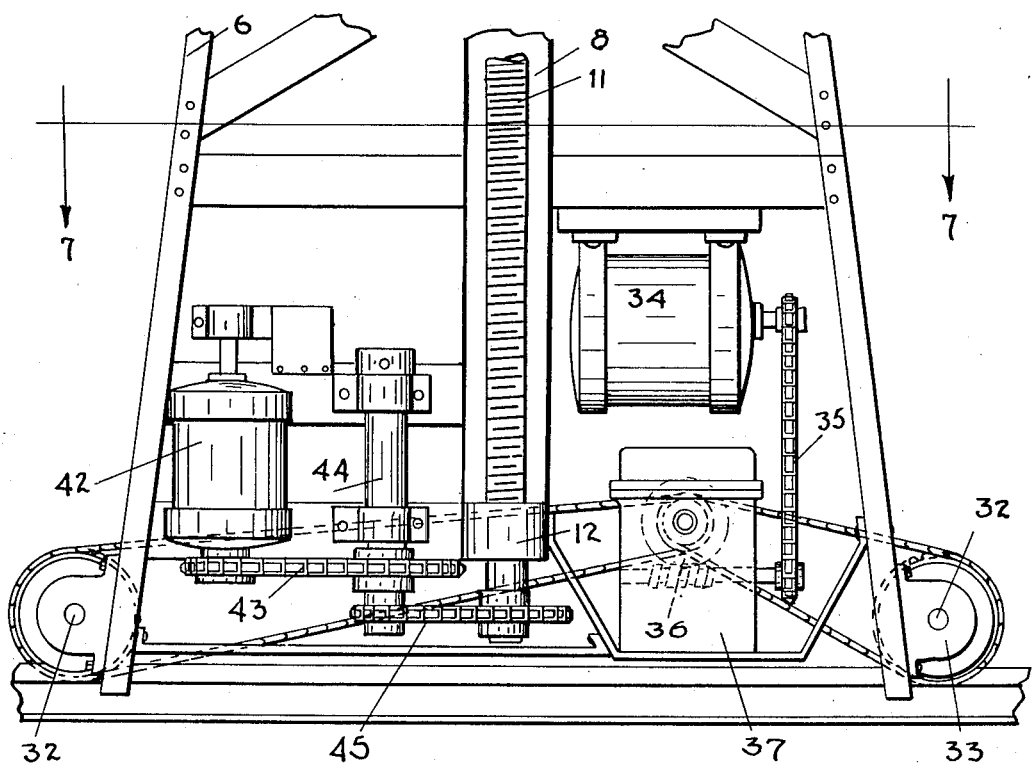
Figure 6 is an enlarged detail view of part of the crane showing the propulsion mechanism for the crane, and the operating means for the elevator of the crane.
Figure 7:
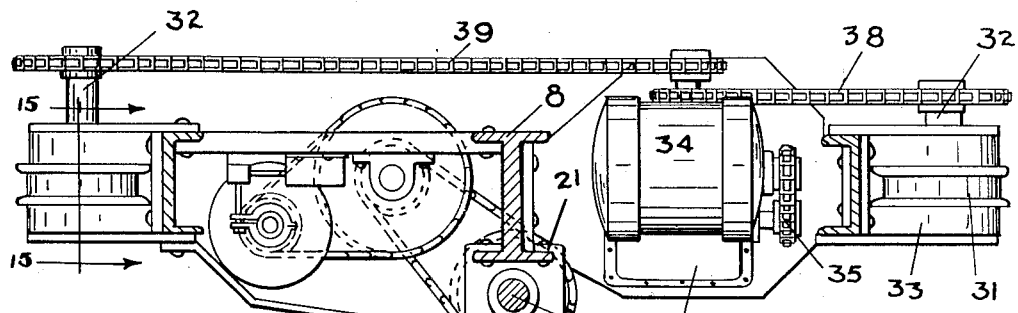
Figure 7 is a horizontal sectional view at line 7—7 of Figure 6.
Figure 8:
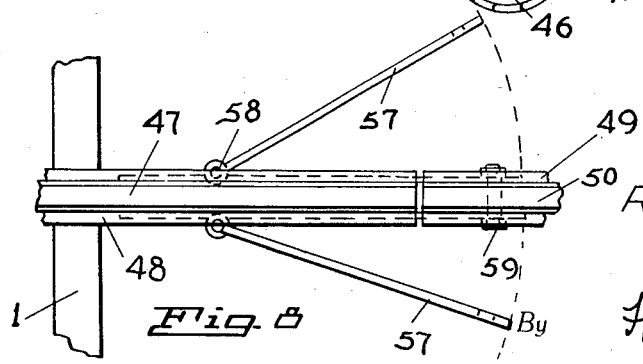
Figure 8 is a detail plan view showing the means for locking the joints of the crane-tracks, with the locking means in open position.

In Figure 1 two stacks of lumber are designated at A and B and these are built up on supports C from the successive piles D that are conveyed about the lumber yard or plant on dollies as E traveling on the track F. A second, narrow gage railway or industrial railroad G, parallels the first railway track F, and the implement of my invention is moved from station to station on the track G for loading or unloading the piles in the formation or taking down of the stacks. The implement is stationed at a desired point on its railway, and the successive dollies loaded with piles are conveyed to the implement and located alongside the implement; the piles are picked up from the dolly (or deposited thereon as the case may be) by the implement, and the unloaded dolly is displaced by a loaded one. After the stacks have been erected at the sides of the double tracks in Figure 1, the implement is moved to another station for the erection of additional stacks.

A motor may be employed for towing or hauling the implement from station to station around the lumber plant, and the trucks or dollies E may also be hauled or towed by the use of motors or electric locomotives, or the dollies may be pushed by hand along the tracks F.

As best seen in Figure 3 of the drawings the implement is supported upon two spaced, four-wheel trucks 1 and 2 with their wheels 3 rolling on the parallel rails of the track G, and the trucks are coupled together by means of the coupling bar or link 4 with couplings 5. The trucks are spaced apart an appropriate distance, determined by the length of the lumber to be handled, and of course the sizes of the implement may be varied for accommodation of different sizes of material to be handled.

Upon each truck 1 and 2 is mounted a tower designated respectively as 6 and 7, preferably constructed of fabricated metal, and each tower has a central, upright or vertical mast 8 fashioned from an I-beam, and these masts are located at the inner adjoining sides of the towers. The towers form the uprights of a traveling crane that is reciprocable on rails, as will be described, transversely of the longitudinal axis of the implement, that is, transversely of the two pairs of railway tracks F and G.

The traveling crane includes an elevator-hoist for the pile D which hoist comprises the horizontal beam 9 that spans the space between the two masts of the two towers, and at its ends the beam has slide bearings 10, 10 surrounding, but not operatively engaging the threads of a pair of upright screw bars 11, 11. These screw bars are disposed at the inner, adjoining sides of the masts and they are supported at their lower ends to revolve in bearings 12 rigid with the trucks 1 and 2, while at their upper ends the screw bars (as seen in Figure 13) have reduced extensions 13 journaled in the overhanging bearing bracket 14 of the tower. Roller bearings 15 are mounted on the bearing bracket 14, for the screw bar, and a bearing cap or cover 16 is used as a shield or protection for the roller bearings. The bottom bearings 12 for the screw bars are also of the anti-friction type to insure smooth turning of these screw bars or operating bars of the elevator hoist.

In its vertical movement, the elevator hoist is raised through the employment of two spaced traveling nuts 17 for each operating screw or screw bar, and these traveling nuts are mounted in a pair of slide bearing blocks 18 and 19, a pair of such blocks being slidably related to each mast 8. As best seen in Figures 3 and 3a the upper slide blocks 19 are located beneath the bearings 10, 10 of the beam 9 to support the crane, and the lower, spaced slide blocks 17 are rigidly connected with the beam by diagonal braces 20 bolted to the beam and to the blocks. As best seen in Figure 3a, each slide block is provided with a pair of guide plates 21 located at opposite sides of the web of a mast, bolted to the blocks, and overlapping the inner flanges of the mast to form a guide groove in the block that slides up and down on the flanged mast. It will thus be apparent that as the two operating screws 11, 11 are turned in unison, the elevator hoist, through the instrumentality of the traveling nuts 17 on the operating bars, will be raised or lowered.

The beam 9 of the elevator hoist supports a traveling, swiveled sling in which the pile D is carried, and the beam is preferably made up of spaced channel-irons suitably joined and braced and provided with exterior horizontal flanges 22 upon which the rollers or wheels 23 (two at each side of the beam 9) of the sling carriage 24, may travel or roll as the sling with its load is guided, manually.

A swivel head 25 is supported at the under side of the carriage 24, and the swivel-bar 26 of the sling is mounted to turn on the head.

Two pairs of hangers or sling-links 27, one pair at each side of the pile D, are suspended by hooks 28 of the swivel-bar, and at their lower ends, beneath the pile D these hanger-links are joined by cross bars 29, spaced apart, and provided with end hooks 30 for detachable connection with the hanger links.

Before the pile D is lifted by the elevator, the cross bars 29 will have been placed in position beneath the pile, and while the pile is supported on the dolly; and in manipulating the sling, the two pairs of hanger links 27, already suspended from the swivel-bar 26, are hooked to the projecting ends of the cross bars 29, after which the elevator and its load may be raised as desired, and as will be described.

The load or pile may be shifted on the carriage longitudinally of the beam 9, and the pile may be turned to desired position through the instrumentality of the swivel bar 26 and swivel head 25, these movements being accomplished, and the load guided, manually.

The traveling crane with the elevator hoist, as a unit, may be moved transversely of the pairs of railway tracks F and G, and for this purpose the towers 6 and 7 are each provided with a pair of spaced, grooved, traction wheels 31 having shafts 32 journaled in suitable bearings 33 rigid with the two towers. The shafts are driven from an electric motor 34 mounted in the base of the tower 6, through transmission or chain drive 35 to gearing indicated at 36 within the gear casing 37, below the motor, and a driven gear shaft 35' projecting from the gearing within the casing 37 transmits power through two chain drives 38 and 39 to the shafts 32 for the propulsion of the traveling crane. Suitable control mechanism is provided for reversing the operation of the electric motor 34 and thereby alternately drive or propel the traveling crane in opposite directions, and the control-man stands on the platform 40 in position for ready access to the control board 41 on which the electric switches are located.

The operation of the elevator-hoist is also controlled from the switch board 41 through connections to a reversible electric motor 42, mounted on the base of the tower 6 adjacent to the crane-motor 34, the motor 42 being provided with a chain drive 43 to the vertical countershaft 44, and from this shaft a second chain drive 45 turns the operating bar or screw bar 11 through a sprocket wheel 46 on the lower end of the operating bar of the elevator-hoist. Each of the operating bars or screw bars of the elevator hoist is provided with the motor operated driving mechanism for turning the screw bars, and the reversible electric motors 42 which operate the screw bars in unison may be reversed for alternate movement of the bars to raise or lower the elevator-hoist.

The pair of traction wheels 31, 31, at the base of which tower 6 and 7, is also provided with a reversible motor and driving means in order that the power may be applied with uniformity to the traveling crane, and to eliminate strains from the towers of the crane.

Each truck 1 and 2 of the implement is provided with a fixed rail section 47 rigidly mounted centrally on the truck and extending transversely of the two railways F and G, and the pairs of wheels 31, 31 of the traveling crane rest upon these fixed rail sections when the traveling crane is centered on the two spaced trucks, as in position of Figure 1. As shown in Figure 1 the rail sections are fixed upon I-beams 48 forming parts of the truck frames, and extensions of these rail-sections and I-beams are provided for use at both sides of the implement in order that the traveling crane may be run out at either or both alternate sides of the implement.

Each truck is provided with a rail-beam 48 forming part of the truck frame, and the rail sections 47 may be welded or affixed on the rail beams in other suitable manner, and as seen in Figure 1 the ends of these rail-beams and rail sections are cut on the arc of a circle, for the accommodation of complementary curved ends of four foldable rail-beams 49 having rail sections 50 welded on the top edges thereof.

Each of the four foldable rail-beams is provided with a pair of hinge arms 51 arranged at opposite sides of the beams and at 52 these arms are pivoted in bearings 53 on the truck frames, while at 54, the converging ends of the arms are pivoted at the opposite sides of the foldable rail beams, preferably on reinforcing plates 55.

In Figure 1 these foldable rail-beams and their rails are shown in folded or retracted position with their pivots 52 at opposite sides of the trucks, and spaced apart, while the beams with their rails are folded slightly inwardly, toward the center of the truck, in order that they may recline against the upper frames 56 of the trucks, or preferably against the opposite inclined sides of the towers 6 and 7 of the traveling crane. As illustrated in Figure 1 the traveling crane is centered in the implement, and the folded rail-beams are located in position when not in use. The folded rail-beams are adapted to be swung on their pivots 52 from the position of Figure 1 to that of Figure 2, where the foldable rail beams are arranged in horizontal alinement with the fixed rail beams and rails of the trucks, to form a track for the traveling crane.

After the foldable rail-beams have been unfolded or lowered into alinement with the fixed rail beams of the truck, the foldable and fixed beams are tied together by the use of hinged joint-plates 57, two pairs of these plates being provided for each rail-beam of a truck, and the joint plates are arranged at opposite sides of the rail beams. The joint plates are hinged at 58 to the beams 48 of the trucks, and their free ends are provided with bolt holes for the reception of clamp bolts 59 passed transversely through the free ends of the hinge plates or joint plates and also through complementary holes 60 in the webs of the foldable rail beams. The fastening bolts 59 are of course removed when the foldable rail-beams are to be folded against the sides of the towers, and the hinged joint plates are turned back on their hinges, as indicated in Figure 1 for clearance purposes.

In Figure 9 an extension rail-beam 61 is shown with its welded rail section 62, and a bumper or chock-block 63 is shown as welded on the top of the rail to limit movement of the traveling crane. The equipment for the implement may include two pairs of these extensions, a pair for use at each side of the implement, or as here illustrated, a pair of extension rail-beams are used only at the stack side of the implement. In Figure 2 the short rail structure at the right extends only a sufficient distance to enable the crane to move to position over the dolly E, while at the left where the extensions 61 are used, the rail structure extends a sufficient distance to permit the crane to deposit the succeeding piles in the formation of the stack.

If necessary or desirable, successive extensions may be added at both the right and left ends of Figure 2.

The chock-block 64 on the folding rail-beam is removable in order that it may be displaced when the rail extensions are to be attached at the right side of the implement in Figure 2, and means are provided for fastening these removable chock-blocks in place at the outer free ends of either of the foldable rail beams.

The extensions are bolted at 65 to the foldable rail beams and the bolts pass through joint plates 66 that are bolted or riveted at 67 to the inner ends of the extension rail beams. One of these plates 66 is secured at each side of the extension beam, and the two plates brace the abutting ends of the foldable rail beam and the extension beam to provide a rigid joint. When the interchangeable extension rail beams are to be moved from one side of the implement to another, the bolts 65 are removed, to permit withdrawal of the extension beams, after which the extension beams are applied to the ends of the foldable rail beams at the other side of the implement and the bolts 65 are used to hold the joint in rigid condition.

The foldable rail-beams, one with its extension and one without an extension for each truck of the implement are power operated to swing them on their pivots 52 to the "in" position, and for this purpose, each of the truck frames 56 is provided with a pair of wire cables 67 and 68 that pass over the guide pulleys 69, 69, journaled in the pulley frames 70 fixed at the upper ends of the truck frames, and each cable, at its free end is provided with a hook 71. When the cables are not in use the hook 71 is anchored in an eye 72, one of which is provided at each side of the upper truck frame 56, as seen in Figure 5.

For folding the foldable rail-beams the hooks 71 are coupled to the pivot pins 54 of the foldable rail beams, and from the guide pulleys the cables pass down to and are wound upon drums 73 mounted on the shaft 74 which is journaled transversely of the railway tracks in bearings 75 rigidly supported on the trucks, and provided with clutches 76 complementary to the drums 73, whereby a selected drum may be coupled with the shaft for winding its cable on the drum for the purpose of folding the foldable rail beam.

The drum shaft 74 is provided with a chain drive indicated at 76'; Figure 5, and this driving mechanism is operated from an electric motor 77, controlled by the control-man on the platform 40, through the proper switch on the switchboard 41. Each truck is provided with a motor 77 and the hoisting drums are mounted in pairs on each truck, in order that a drum on each truck may be revolved for folding the rail-beams up against the upper frame, or the towers of the crane.

As shown in Figure 2, and Figure 14, jacks 78 of suitable type are employed, under the rail sections, and also under the truck for holding the implement is stationary position while the dolly is being unloaded and the traveling crane is traveling back and forth from the dolly to the stack of lumber, and of course, the jacks under the rail beams support the latter and the crane as it travels back and forth on its rails.

A pair of spring-wound cable-drums 79 are indicated in Figures 2 and 5 for the purpose of carrying the power line and control line cables from the control-board 41 and contactor boxes 80 to the operating mechanism on the lifting towers.

Ball bearings are employed in connection with substantially all of the revolving wheels, pulleys, drums, and the operating screw bars for the elevator hoist, as well as with other parts, to insure a smooth working implement, and to eliminate noise as well as friction so far as possible. Ball bearings are also provided for the traveling nuts and slide bearings of the operating screws of the elevator hoist.

Contactor boxes 80 are shown on the upper frames of the trucks for electrical connection from the source of supply to the electric motors, which motors are preferably of the reversible, induction type, and provided with electrically operated magnetic brakes.

Suitable braces are provided for the operating parts of the implement, as for instance reinforcing plates 81 that are welded at the sides of the I-beams forming the rail-beams of the crane tracks, and gear casings, as 82 in Figure 2 are provided for shielding the operating parts enclosed therein as well as for safety to the workmen. The drive chains 38, 39, 43, 45, are of the roller chain type with complementary sprocket wheels, to reduce friction and noise, and facilitate the smooth operation of the machine or implement.

The construction and operation of the implement are believed to have been set forth in the preceding specification, and it will be apparent that the implement, which has been in successful use for some time, has materially and substantially reduced time, labor and expense in the orderly handling of the material about the lumber plant. While I have shown one exemplification of the use of the implement in removing the piles from the dollies and erecting a stack from these successive piles, it will be apparent that various other operations of the implement may be accomplished, usually by the services of three men, one at the control platform 40, another to fasten the sling about the pile, and the third man stationed at the stack for unloading the pile in its place on the stack.

Having thus fully described my invention, what I claim as new and desire to secure by Letters Patent is:—

1. In an implement as described, the combination with a wheeled truck having a fixed transversely extending beam forming part of the truck-frame, and a rail mounted on said beam, of a complementary foldable beam adapted for horizontal alinement with the fixed beam and a rail mounted on the foldable beam, hinge arms pivoted at one end on the truck and connected to said foldable beam, and means on the truck for lifting the foldable beam to inoperative position.

2. The combination in a lumber piler with a pair of spaced railway trucks, a detachable coupling bar between the trucks, and a transversely arranged, fixed, rail section on each truck, of a foldable rail section adapted for horizontal alinement at each end of said rail sections, hinge arms pivoted at opposite sides of the trucks and connections between said arms and the foldable sections, a plurality of jacks for supporting the foldable sections in horizontal position, detachable joint plates between the fixed sections and the foldable sections, and power operated means on the trucks for folding the foldable sections to inoperative position when the joint plates are detached.

ROBERT T. BOWLING.